United States Patent [19]

Speakman

[11] 3,936,205
[45] Feb. 3, 1976

[54] CROWNED HEAD RIVETED JOINT

[75] Inventor: Eugene R. Speakman, Fullerton, Calif.

[73] Assignee: McDonnell Douglas Corporation, Long Beach, Calif.

[22] Filed: June 3, 1974

[21] Appl. No.: 475,792

Related U.S. Application Data

[63] Continuation-in-part of Ser. No. 291,669, Sept. 25, 1972.

[52] U.S. Cl. ............... 403/279; 52/758 F; 403/388; 85/37
[51] Int. Cl.² .................... B25G 3/28; F16B 7/04
[58] Field of Search .......... 52/758 F; 85/37, 53, 54; 403/279, 280, 388

[56] References Cited
UNITED STATES PATENTS

| | | | |
|---|---|---|---|
| 1,145,256 | 7/1915 | Mochow et al. | 151/14.5 X |
| 2,233,820 | 3/1941 | Pavlecka | 85/37 X |
| 2,237,338 | 4/1941 | Dale | 85/37 |
| 3,029,912 | 4/1962 | Barker | 52/758 F |
| 3,405,594 | 10/1968 | Falcioni | 85/37 |
| 3,526,032 | 9/1970 | Pipher | 52/758 F X |
| 3,680,429 | 8/1972 | Briles | 85/37 |
| 3,821,871 | 7/1974 | Schmitt | 52/758 F |

FOREIGN PATENTS OR APPLICATIONS

| | | | |
|---|---|---|---|
| 707,103 | 6/1941 | Germany | 85/37 |
| 790,051 | 2/1958 | United Kingdom | 85/54 |

Primary Examiner—Thomas F. Callaghan
Assistant Examiner—Wayne L. Shedd
Attorney, Agent, or Firm—G. W. Finch; W. J. Jason; D. L. Royer

[57] ABSTRACT

A riveted joint employing a rivet having a cylindrical shank and a head with a conical undersurface, flared uniformly outwardly from the shank and truncated by an upper surface that is generally similar to the minor portion of a filled torus, sliced normal to its centerline. When being installed in a workpiece aperture to form the joint, the rivet head cold-flows to assume adequate expansion into the aperture while becoming generally flush to the workpiece surface so rivet head shaving is not required.

5 Claims, 2 Drawing Figures

CROWNED HEAD RIVETED JOINT

RELATED APPLICATION

This is a continuation-in-part of copending Pat. application Ser. No. 291,669 for Crowned Head Rivet, Joint and Method filed 25 Sept. 1972 by Eugene R. Speakman which is assigned to applicant's assignee.

BACKGROUND OF THE INVENTION

Present practice in the aircraft industry is to build airplanes out of components that are joined together by rivets. The heads of the rivets at the surfaces of the airplane experiencing high velocity airflow are usually made substantially flush with the surfaces. This results in substantially less aerodynamic drag than would otherwise be generated if raised-head rivets were used.

The surface components usually are provided with dimpled, countersunk or otherwise recessed holes that receive the rivet heads to be installed in a flush condition. The most prevalent procedure for flush riveting is to install rivets having oversized heads. The extra material of the oversized head is then shaved off until the head is nearly flush with the surrounding surface. This "nearly" rather than absolutely flush condition, though undesirable, is dictated by the need of a production tolerance to assure that damage to the surface adjacent to the rivet head is avoided since structural damage occurs when rivet heads are inadvertently shaved below the surface. The protruding edge of the shaved rivet head often presents a sharp edge to the high velocity airflow which is a source of drag that can be unexpectedly large especially when the sharp edge is raised by yielding of the riveted joint. Also it is difficult to assure the complete expansion of the head and shank of a rivet designed to be shaved. Once the rivet is installed, no satisfactory non-destructive test is available to find the poorly installed rivets. Thus, during the design process, designers must take into consideration that some walls of the rivet holes are not expanded to optimum size by the rivet which means components must be overdesigned.

The installation difficulty of the prior art rivets is usually caused by the overlapping of rivet head periphery which is forced by the rivet hammer against the surface adjacent to the edge of the countersink, thereby supporting the hammer and preventing the desired flow of rivet head material into the countersink and hole. As has been proved by comparative tests which show the superiority of the present invention, the lack of rivet head material flow on the shaved flush rivet results in much lower fatigue strengths of the riveted joints. Another problem with the shaved flush rivet is the shaving procedure removes the center indent or other indication normally provided to identify the material from which the rivet is made. Also, when a shaved head rivet is inadvertently installed into a countersink which is too shallow, the shaving operation destroys the inspectability of the error and removes too much of the rivet head. This can cause the head to fail by "cupping" in service.

Another cause for concern with the prior art rivets is that shaving rivets made from monel and other relatively hard materials required in modern titanium structures, costs five times more than shaving aluminum rivets. At the present, the cost of shaving aluminum rivets on large commercial aircraft is about $20,000 per aircraft.

SUMMARY OF THE INVENTION

The rivet used in the present joint is comprised of a cylindrical shank with a head on one end that has a conical underbody flared uniformly outward from the shank and truncated by an upper surface that is the minor part of a filled torus. The rivet head fits into a dimpled or countersink aperture prepared for it in the surface of the workpiece with its central head portion just above the surface and the head periphery just below the surface. This shaping assures that the head material can never contact the adjacent surface around the countersink during installation. Therefore, the head material flows downwardly and outwardly as is desired to completely fill the aperture and countersink and to expand the rivet shank sufficiently to assure that optimum comprissive forces are applied to the material forming the walls of the aperture. The obtaining of optimum compressive forces markedly improves the fatigue strength of the riveted joint. In the present joint, the crown flush rivet tends to be self-centering and does not drive off center as sometimes happens with a shaved flush rivet or a domed shape rivet without a flat central surface.

It is therefore an object of the present invention to provide a flush riveted joint where the rivet head does not have to be shaved after driving.

Another object is to provide a joint which improves the fatigue life of structural members through which rivets are inserted.

Another object is to provide a flush riveted joint that indicates an improper installation procedure.

These and other objects and advantages of the present invention will become apparent after considering the following detailed specification which covers a preferred embodiment thereof in conjunction with the accompanying drawing wherein:

DESCRIPTION OF THE PRESENT EMBODIMENT

Figure 1:
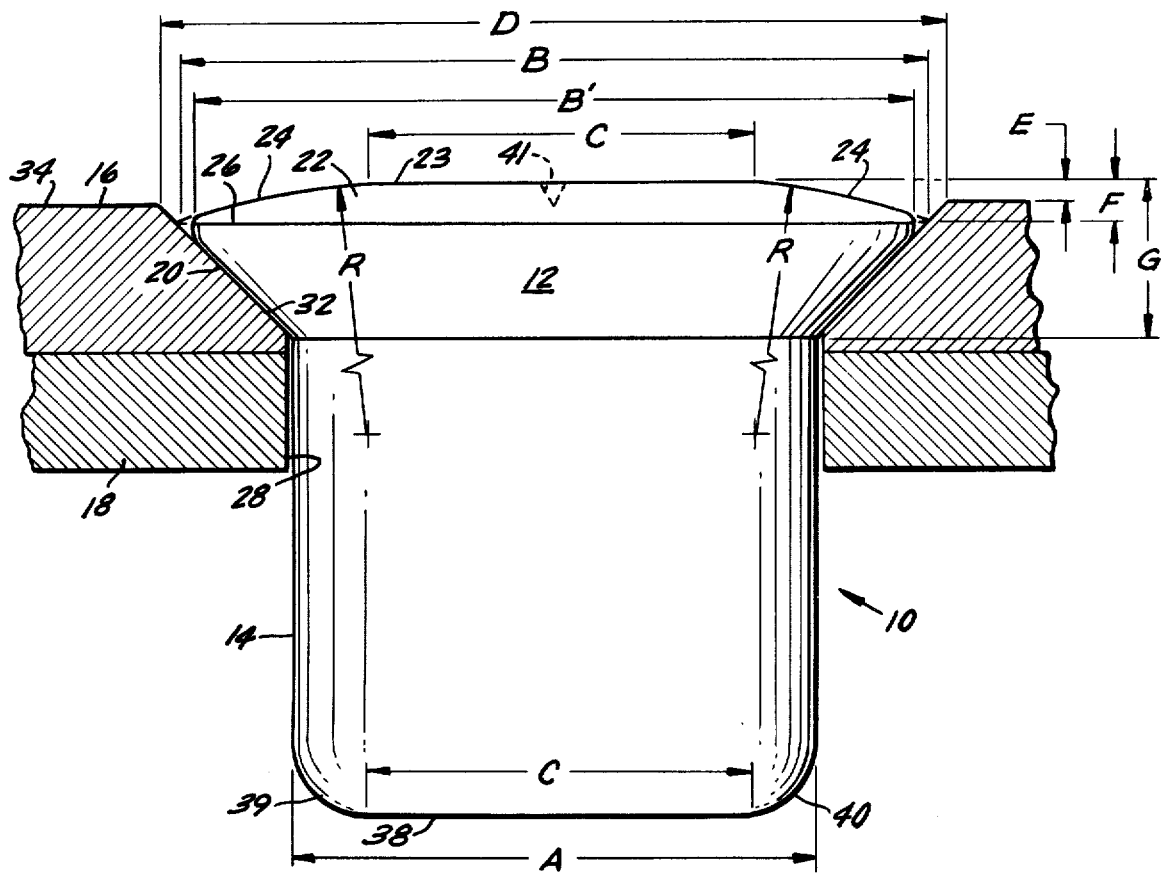
FIG. 1 is an elevational view of a rivet inserted in a pair of overlapping plates shown in cross-section prior to the formation of the present joint.

Referring to the drawing more particularly by reference numbers, number 10 in FIG. 1 denotes a crown flush rivet constructed according to the present invention. The rivet 10 includes a rivet head 12 of height G which is integral with a cylindrical shank 14 of diameter A. The head 12 and shank 14 cooperate when driven to secure together two or more structural members 16 and 18.

The rivet head 12 has a conical undersurface 20 which flares uniformly outward from the cylindrical shank 14. The conical undersurface 20 is truncated by a curved upper surface 22 that is geerally similar to a portion of a torus, the central portion of which is filled to produce a planar central surface 23 of diameter C. The upper surface 22 also includes a surface portion 24 which curves upwardly a distance F with a radius of curvature R from the head maximum diameter peripheral edge 26 of diameter B between the surface 22 and the undersurface 20 to merge smoothly with the planar central surface portion 23. When placed in a rivet hole 28 having a countersink 32 of maximum diameter D and an angle similar to the angle of the conical undersurface 20, the peripheral edge 26 of the rivet head 12 resides in the countersink 32 below the exposed surface 34 of the member 16 before and after the rivet 10 is driven. This prevents the rivet head 12 from overhanging the countersink 32 which, in conventional flush rivets, causes transfer of force from the edge of the rivet head to the member 16 without proper deformation of the rivet 10. As can be seen, the peripheral edge 26 can be the line of intersection between the surface portion 24 and the conical undersurface 20 or the edge 26' can be slightly rounded to form a small cylindrical surface 26a which is faired into the conical undersurface by a radius 26b. The rounding of the edge 26 makes the fabrication of the rivet 10 more precise since in some instances, automatic rivet formers have difficulty keeping the head 12 axially aligned with the shank 14 when the sharp edge 26 is employed. The removal of the sharp edge does not otherwise change the features of the rivet 10. The central surface 23 of the rivet head 12 which is the portion of the rivet 10 in contact with the driving rivet gun, stands above the surface 34 a distance E. After the rivet 10 is driven, the level of the central surface 23 is reduced almost flush, i.e., from 0.003 to 0.000 inch, with surface 34 by the flow of rivet head material into the countersink 32 and the hole 23 in the members 16 and 18. The flow is shown by arrows 37 in FIG. 2 where the original shape of the surface 22 is shown in dashed outline for comparison.

Figure 2:
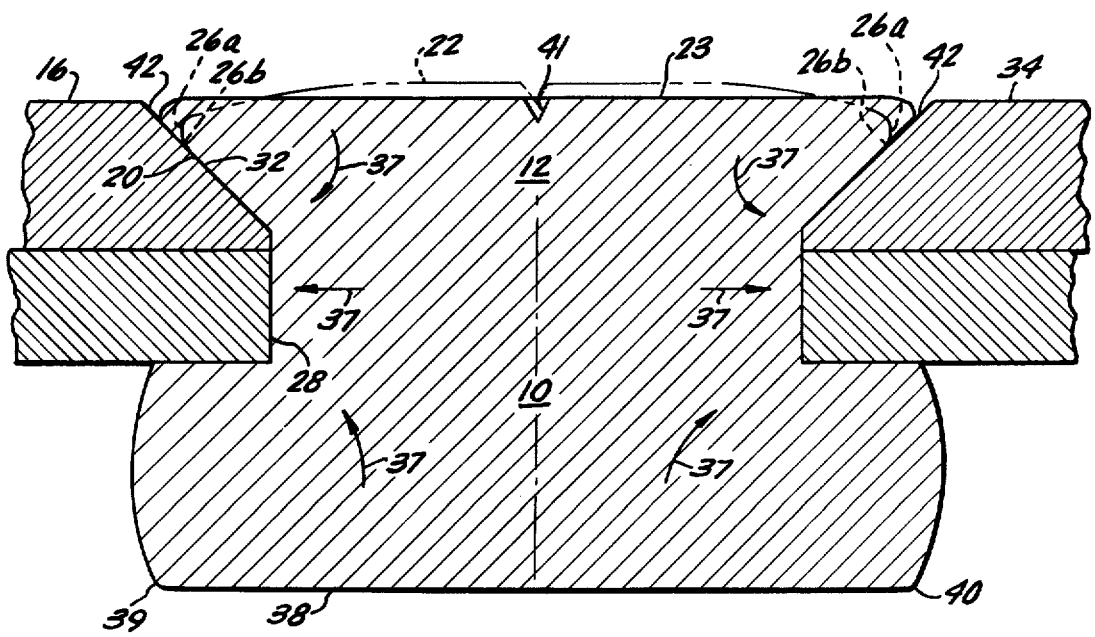
FIG. 2 is a cross sectional view of the rivet plate assembly of FIG. 1 after being bucked or driven to secure the pair of plates to form the joint.

The shank 14 includes a flat bucking surface 38 and a curved portion 39 to form the end 40 thereof. The flat portion 38 is preferably of diameter C and in parallel alignment with the central portion 23 so the upset forces are balanced by the equal contact areas on the opposite ends of the rivet 10. As can be seen in FIG. 2, the sizes of the flat surfaces 23 and 38 generally correspond during the rivet driving operation. The central portion 23 being a planar surface assists in keeping the rivet gun in proper driving position and the aforementioned end to end force balance assures that the rivet gun energy flows the rivet material axially inward and radially outward to fill all voids in the joint. The planar nature of the central portion 23 and the flat portion 38 also assures that the force of the rivet gun is relatively evenly distributed through the rivet unlike domed flush rivets where the initial rivet gun blows act on a small column through the center of the rivet. As can be seen in FIG. 2, the center indent 41 of the rivet 10 is not destroyed by the driving operation and can later act as an identifier or as a center if it is desired to drill out the rivet 10.

Head dimensions can be optimized and selected for both tension head or shear head rivets. The dimensions for typical tension and shear rivets are shown in the following tables.

TABLE I

| NOM SHANK DIA | A DIA +.002 −.001 | B DIA ±.002 | TENSION HEAD CROWN FLUSH CONFIGURATION | | | | | |
|---|---|---|---|---|---|---|---|---|
| | | | C FLAT (REF) | D DIA C'SINK | E BEFORE DRIVING | F ±.001 | G (REF) | R RAD ±.005 |
| 3/32 | .094 | .150 | .044 | .160 .170 | .002 .010 | .012 | .036 | .125 |
| 1/8 | .125 | .196 | .064 | .206 .216 | .002 .010 | .012 | .042 | .188 |
| 5/32 | .156 | .257 | .102 | .267 .277 | .002 .010 | .012 | .055 | .250 |
| 3/16 | .187 | .324 | .152 | .334 .344 | .002 .010 | .012 | .070 | .312 |
| 1/4 | .250 | .447 | .259 | .457 .467 | .002 .010 | .012 | .095 | .375 |

Note: B' DIA is about .007 smaller than B DIA

TABLE II

| NOM SHANK DIA | A DIA +.002 −.001 | B DIA ±.002 | SHEAR HEAD CROWN FLUSH CONFIGURATION | | | | | |
|---|---|---|---|---|---|---|---|---|
| | | | C FLAT (REF) | D DIA C'SINK | E BEFORE DRIVING | F ±.001 | G (REF) | R RAD ±.005 |
| 3/32 | .094 | .117 | .043 | .135 .140 | .002 .008 | .012 | .021 | .063 |
| 1/8 | .125 | .165 | .059 | .175 .185 | .002 .008 | .012 | .029 | .125 |
| 5/32 | .156 | .216 | .084 | .226 .236 | .002 .008 | .012 | .037 | .188 |
| 3/16 | .187 | .273 | .119 | .283 .293 | .002 .008 | .012 | .046 | .250 |
| 1/4 | .250 | .366 | .194 | .376 .386 | .002 .008 | .012 | .060 | .312 |

Although Tables I and II can be interpolated, they tabulate the results of fatigue and strength tests during which the dimensions of the various rivet sizes were optimized for aluminum and monel rivets and standard production tolerances.

Rivets constructed to the dimensions shown in the tables fully fill the voids and prestress the countersink 32 and hole 28.

After the rivet 10 is upset, a small indentation 42 remains which is concentric around the rivet head 12. The width and depth of the indentation 42 can be measured to assure that the rivet 10 was installed to production tolerances. Although aerodynamic tests have shown that the small indentation 42 and the 0.000 to 0.003 crown that remains create less aerodynamic drag than standard flush rivet installations, the present rivet can be shaved using the central indent 41 or the concentric indentation 42 as a centering guide. Then the indentation is filled with suitable material such as paint or putty to provide a smooth surface.

Thus there has been shown and described novel flush head rivet joints that fulfill all the objects and advantages sought therefor. Many changes, alterations, modifications and other uses and applications of the subject invention will become apparent after considering this specification and the accompanying drawing. All such changes, modifications and variations and other uses and applications which do not depart from the spirit and scope of the invention are deemed to be covered by the invention which is limited only by the claims which follow.

What is claimed is:

1. A riveted joint for joining a plurality of members including:

a first member having a uniformly flared countersunk opening having maximum and minimum diameters defined therein and a cylindrical opening in axial alignment with said countersunk opening defined therein;

a second member having a cylindrical opening defined therein, said cylindrical opening in said second member being adjacent to and in registration with said cylindrical opening of said first member; and a rivet inserted through said registered openings, said rivet having a shank and a head of shapes complementary to said openings which axially compressively engage said structural member openings and radially expand said openings, the head of said rivet before driving having an upper surface shaped generally similar to the minor portion of a filled torus to form a crown having a generally planar raised central portion, the largest diameter periphery of said rivet head being positioned below the plane of the maximum diameter periphery of said countersunk opening and the crown being positioned above the plane of maximum diameter periphery of said countersunk opening.

2. The joint defined in claim 1 wherein said rivet head and first member countersunk opening define a visually apparent a concentric identation about said rivet heat which is indicative of the proper installation of said rivet.

3. The joint defined in claim 2 wherein said defined concentric indentation is filled with filler material.

4. The joint defined in claim 1 wherein said planar central portion extends no further than 0.003 inch above the plane of the maximum diameter periphery of said countersunk opening after driving.

5. The joint defined in claim 1 wherein said central planar portion of said rivet head has a surface area similar to the surface area of said shank before, during and after the riveted joint is formed to assure said shank radially expands said cylindrical openings.

* * * * *